United States Patent [19]

Mueller

[11] Patent Number: 4,536,520

[45] Date of Patent: Aug. 20, 1985

[54] POLYPHOSPHAZENE FOAM PROCESS

[75] Inventor: Warren B. Mueller, Baton Rouge, La.

[73] Assignee: Ethyl Corporation, Richmond, Va.

[21] Appl. No.: 619,518

[22] Filed: Jun. 11, 1984

[51] Int. Cl.³ .............................................. C08J 9/10
[52] U.S. Cl. ...................................... 521/89; 521/93; 521/180; 521/189
[58] Field of Search .................... 521/89, 189, 93, 180

[56] References Cited

U.S. PATENT DOCUMENTS

| | | | |
|---|---|---|---|
| 3,994,838 | 11/1976 | Thompson et al. | 521/189 |
| 4,026,838 | 5/1977 | Dieck et al. | 521/189 |
| 4,076,658 | 2/1978 | Dieck et al. | 521/189 |
| 4,083,820 | 4/1978 | Dieck et al. | 521/189 |
| 4,092,278 | 5/1978 | Dieck et al. | 521/189 |
| 4,107,108 | 8/1978 | Dieck et al. | 521/189 |
| 4,113,670 | 9/1978 | Dieck et al. | 521/189 |
| 4,124,557 | 11/1978 | Dieck et al. | 521/189 |
| 4,124,567 | 11/1978 | Dieck et al. | 521/189 |
| 4,136,084 | 1/1979 | Dieck et al. | 521/189 |

*Primary Examiner*—Morton Foelak
*Attorney, Agent, or Firm*—Donald L. Johnson; John F. Sieberth; Joseph D. Odenweller

[57] ABSTRACT

Foamed polyphosphazene articles having consistent appearance and physical properties are made by masticating a mixture of high molecular weight linear polyphosphazene, a curing agent (e.g., sulfur), an accelerator, a blowing agent and optionally fillers, processing aids and the like until the temperature of the composition rises to a pre-determined level. Mixing is stopped and the composition is shaped, heated to pre-cure and then heated to activate the blowing agent and complete the cure.

23 Claims, No Drawings

POLYPHOSPHAZENE FOAM PROCESS

BACKGROUND

Cellular plastics have been available for many years. One of the first of such materials was cellular rubber dating to the 1910-1920 period. Subsequently cellular compositions were made from latex, phenol-formaldehyde resins, urea-formaldehyde resins, PVC, polyurethane, cellulose acetate, polystyrene, polyethylene, epoxides, ABS resins, silicones and very recently polyphosphazenes. Polyphosphazene foams have very desirable properties in that they are highly fire resistant and when subject to direct flame do not produce toxic smoke which is encountered with many other common foamed materials, noteably polyurethanes.

Polyphosphazenes are polymers containing a plurality of $-P<=N-$ groups wherein substituents are bonded to phosphorus. The polyphosphazenes which are the concern of this invention are high molecular weight linear polyphosphazenes containing 50 or more of the above units and having molecular weights from about 10,000 up to 5,000,000 or higher. They are substantially linear and have little if any cross-linking. In general, they are soluble in benzene, toluene, cyclohexane, and tetrahydrofuran and are relatively insoluble in linear aliphatic hydrocarbons such as hexane or heptane. Groups substituted on phosphorus include phenoxy, alkylphenoxy, alkoxyphenoxy, aminoalkylphenoxy, alkylaminoalkylphenoxy, dialkylaminoalkylphenoxy, halophenoxy (e.g., para-chlorophenoxy, meta-bromophenoxy, trifluorophenoxy and the like), haloalkylphenoxy (e.g., trifluoromethylphenoxy), alkoxy, haloalkoxy (e.g., trifluoroethoxy), alkenylphenoxy (e.g., ortho-allylphenoxy and the like).

Methods of making cellular polyphosphazenes are known. Various procedures are described in U.S. Pat. Nos. 4,026,838; 4,055,520; 4,055,523; 4,107,108; 4,189,413 and others. In general, the foams are made by mixing the polyphosphazene gum, a blowing agent and a peroxide or sulfur-type curing agent and heating the blended components to activate the blowing agent and cure the resultant foam. Control of the process to obtain uniform results leaves much to be desired. When the process is conducted in what appears to be the same manner based on mixing time, composition, foaming temperature and curing temperature, different results frequently occur. After making an acceptable foamed product, the next run although conducted with the same composition can give a poor result such as a split in the foam interior.

SUMMARY OF THE INVENTION

It has now been discovered that the inconsistencies in the foaming process can be essentially eliminated by monitoring the temperature of the composition during the mixing operation and conducting the mixing or mastication only until the mass temperature reaches a pre-determined level and then stopping the mixing at that temperature rather than mixing for any fixed time period.

DESCRIPTION OF THE PREFERRED EMBODIMENTS

A preferred embodiment of the invention is a process for making a polyphosphazene foam having consistent appearance and physical properties, said process comprising:

(A) forming a composition comprising a substantially linear high molecular weight polyphosphazene gum, a curing agent, a blowing agent and optionally a plasticizer, an inorganic filler, an accelerator and processing aids, (B) masticating said composition to form a substantially homogeneous blend while measuring the temperature of said composition undergoing mastication and continuing said masticating until said temperature rises to a pre-determined level and then stopping said masticating, (C) forming the resultant masticated composition into a shaped composition and (D) heating said shaped composition in an unconfined environment to a temperature which activates said blowing agent causing said shaped composition to expand into a foamed composition and completing cure of said foamed composition.

High molecular weight linear polyphosphazenes are known polymers. Their preparation is described in the literature and in patents such as U.S. Pat. Nos. 3,515,688; 3,700,629; 3,702,833; 3,838,073; 3,843,596; 3,844,983; 3,853,794; 3,883,451; 3,888,799; 3,888,800; 3,896,058; 3,943,088; 3,948,820; 3,970,533; 3,972,841; 3,994,838; 4,006,125; 4,116,785; 4,123,503; 4,128,710 and 4,129,529.

In general, linear polyphosphazenes consist essentially of $-P<=N]_n$ in which n can range from about 50 to 50,000 or more and wherein any of a large number of groups can be substituted on phosphorus. Substituent groups can include alkoxy, substituted alkoxy such as haloalkoxy or alkoxyalkoxy, aryloxy, substituted aryloxy wherein the substituents can be alkyl, alkoxy, halo, alkenyl, haloalkyl, amino, alkylamino, dialkylamino and the like. Other phosphorus substituents can be halogen (e.g., chlorine), alkenoxy and the like.

In developing the present invention, excellent results have been achieved using polyphosphazene in which the substituents were a random mixture of phenoxy, para-ethylphenoxy and ortho-allylphenoxy groups. The ortho-allylphenoxy groups impart curing properties to the polyphsophazene gum. A preferred ratio is about 30-60 mole percent phenoxy, 30-60 mole percent para-ethylphenoxy and 1-20 mole percent ortho-allylphenoxy.

In making a foam, the polyphosphazene gum is first blended with other ingredients to give a formulation. An essential component of the formulation is a blowing agent. The amount of blowing agent should be that which will evolve sufficient gas to give a foam of the desired density but not an excessive amount which results in splitting of the foam. Blowing agents decompose to evolve gas upon heating. This decomposition temperature varies over a wide range with different foaming agents. Many foaming agents are azo compounds which evolve nitrogen when undergoing thermal decomposition. Examples of blowing agents includes dinitrosopentamethylenetetramine, 4,4'-oxybis(benzenesulfonyl hydrazide), axodicarbonamide, ammonium carbonate, ammonium bicarbonate, sodium bicarbonate, ammonium nitrite, tertbutylamine nitrite, guanidine nitrite, guanylurea nitrite, sodium borohydride, potassium borohydride, urea, biuret, N-nitro urea, diazomaniobenzene, 2,2'-azobis(2-methylpropionitrile), 2,2'-azobis, isobutyronitrile, 1,1'-azobiscyclohexanecarbonitrile, azobisisobutyramidoxime, azobisformamide, N,N'-ditert-butylazobisformamide, N,N'-diphenylazobisformamide, phenylhydrazine, benzylmonohydrozone, benzenesulfonyl hydrazide, methyl carbanilate, 4,4'-oxybis(benzenesulfonyl hydrazide), 3,3'-sulfonylbis(benzenesulfonyl hydrazide), cyanuric trihydrazide, 4,4'-oxybis(benzenesulfonyl semi-carbizide), benzoylazide, p-tert-butylbenzoylazide, diphenyl-4,4'-disulfonyldiazide, N,N'-dimethyl-N,N'-dinitroso terephthalamide and the like.

Curing agents encompass a broad range of compounds which serve to promote cross-linking of the polyphosphazene. One class of curing agents is made up of peroxides. The most important curing agent used to make the present foamed compositions are the sulfur-type curing agents generally referred to as vulcanizing agents. A typical sulfur vulcanizing system comprises sulfur, an accelerator and promotors. Zinc oxide is usually included with the sulfur. Other accelerators include zinc dialkyldithiocarbamates (e.g., zine dimethyldithiocarbamate, zinc dibutyldithiocarbamate and the like). Other useful accelerators are zinc benzothiazylsulfide, N-cyclohexyl-2-benzothiazylsulfenamide, 4,4'-dithiomorpholine, fatty acids in combination with zinc oxide such as stearic acid, zinc fatty acid salts such as zinc stearate, tetraalkylthiuram monosulfide, tetraalkylthiuram disulfide, 2-benzothiazoyl disulfide, zinc benzothiazolyl mercaptide, mercaptobenzothiazole, 2-benzothiazolylsulfenamide, amines, diphenyl guanidine, thiobisamines and the like.

Another component that is usually included in polymer foam compositions is a filler. These are usually inorganic materials although some organic materials are used. Examples of fillers are clay, talc, mica, asbestos, feldspar, bentonite, wollastonite, fullers earth, pumice, pyrophillite, rottenstone, slate flour, vermicullite, calcium silicate, magnesium silicate, alumina, hydrated alumina, antimony oxide, magnesia, titania, zinc oxide, silica, calcium carbonate, barium carbonate, magnesium carbonate, barium sulfate, calcium sulfate, lime, magnesium hydroxide, carbon black, graphite, metal powders, fibers and whiskers, barium ferrite, magnetite, molybdenum disulfide, glass fibers or flakes, ground glass and the like.

The polyphosphazene formulations which are foamed according to the present invention generally include a plasticizer. These can be liquids which when blended with the polyphosphazene gum and the other components tend to reduce the viscosity of the mass and assist in making a homogenous blend. Useful plasticizers include tricresylphosphate, triphenylphosphate, cresyldiphenylphosphate, buty octyl phthalte, dibutyl phthalate, dicyclohexyl phthalate, diisodecyl phthalate, di-2-ethylhexyl phthalate, ditridecyl phthalate, isooctylisodecyl phthalate, diisodecyl adipate, di-2-ethylhexyl adipate, octyldecyl adipate, diisobutyl adipate, diisooctyl adipate, di-2-ethylhexyl azelate, diisodecyl azelate, dibutyl maleate, glycerol ricinoleate, isopropyl myristate, isopropyl palmitate, butyl oleate, glycerol trioleate, methyl oleate, 2-ethylhexyl oleate, dibutyl sebacate, di-2-ethylhexyl sebacate, butyl stearate, 2-ethylhexyl stearate, triethyleneglycol dicaprate, ethylene glycol terephthalate polyesters, diethylene glycol dipelargonate, polyethylene glycol 200 dibenzoate, polyethylene glycol 600 dibenzoate, glycerol triacetylricinoleate, adipic acid glycol polyester 6,000 and the like.

The amount of the different components in the formulation can vary widely based upon parts by weight per 100 parts by weight of polyphosphazene gum. A useful range is given in the following table:

| | |
|---|---|
| Polyphosphazene gum | 100 |
| Sulfur | 5-20 |
| Accelerator | 0.1-5 |
| Blowing agent | 10-50 |
| Filler | 50-300 |
| Plasticizer | 5-50 |

The components in the formulated composition are then subjected to mechanical mixing or mastication to form a substantially uniform blend. This mixing is conducted in the same type equipment used in compounding rubber prior to vulcanization. Suitable mixing equipment on the laboratory scale is marketed under the trademark "Brabender". Larger mixing equipment is marketed under the "Banbury" trademark. These are heavy duty mixers that crush and masticate the formulation until it forms a homogenous blend.

Much of the energy used to mix the composition is converted to heat causing the temperature of the composition to increase during mastication. A critical feature of the present invention is that the mastication time is controlled by monitoring the temperature of the composition undergoing mastication and stopping the mastication when the temperature reaches a pre-determined level. This pre-determined temperature must initially be determined experimentally for each different formulation. This requires only a limited number of test runs in which the mixing is conducted up to several different maximum temperatures in about 5° C. increment. A useful range in which to conduct these initial tests is in the range of about 55°-80° C. In most cases, the best results were achieved in the range of about 65°-75° C. Once the peak mixing temperature that resulted in a cellular polyphosphazene having optimum properties is determined, each subsequent batch of the same formulation is mixed only until it reaches the same peak temperature.

After the mixing operation, the composition is shaped into the desired form such as slabs for use in insulation or cushions. It can also be extruded into hollow cylindrical forms for use as pipe insulation.

The shaped composition can then be aged at a temperature above the pre-determined maximum mixing temperature but below the activation temperature of the blowing agent. This operation causes a limited amount of cross-linking to occur raising the viscosity of the composition such that the blowing gas does not escape during the blowing operation. Good results have been achieved when the shaped composition is maintained at a pre-cure temperature of about 100°-120° C. for a period of about 5-20 minutes.

In the next operation, the shaped composition is heated in an unconfined environment to a temperature high enough to activate the blowing agent. The composition then expands forming a cellular polyphosphazene article. The term "unconfined environment" means that there is space available into which the shaped polyphosphazene composition can expand during cell development. As it reaches its final volume it may again be confined in some form or mold.

A series of foaming operations were carried out in which the initial mixing was conducted while measuring temperature. The basic formulation charged to each batch contained:

|  | Parts by wt. |
| --- | --- |
| Polyphosphazene gum | 100 |
| Alumina trihydrate[1] | 180 |
| Silica-filled methyl-vinyl silicone[3] | 10 |
| Polyethylene glycol 4,000 mol. wt[3] | 2 |
| Zinc stearate[5] | 10 |
| Titanium dioxide[6] | 8 |
| Azodicarbonamide[2] | 25 |
| Piperdinum pentamethylene dithiocarbamate[5] | 2 |
| Zinc dimethyldithiocarbamate[5] | 0.5 |
| Zinc di-n-butyldithiocarbamate[5] | 0.5 |
| Sulfur[7] | 7 |
| Phosphazene oil[4] | 10 |

[1]Filler
[2]Blowing agent
[3]Processing aid
[4]Plasticizer (phenoxy, p-ethylphenoxy, o-allylphenoxy substituted trimer and tetramer polyphosphazene)
[5]Accelerator
[6]Pigment
[7]Curing agent The polyphosphazene gum was a high molecular weight linear polymer substituted with about 40 mole percent phenoxy, 55 mole percent p-ethylphenoxy and 5 mole percent o-allylphenoxy groups.

The ingredients were placed in the mixing chamber of either a Brabender intensive mixer or a Banbury mixer. The mixing was conducted while the temperature was monitored. The mixing was terminated at various temperatures to determine the effect of maximum mixing temperature of the final foam properties.

The blended formulation was removed from the mixer and passed between the rolls of a two roll mill about 40 passes with folding between passes to form a 0.5 cm sheet. This sheet was cut to form a rectangular slab which was placed in a mold. The mold was placed in a pre-cure oven maintained at 110° C. which is below the activation temperature of the blowing agent. The slab was then removed from the mold and placed in a foaming oven for a twenty minute period. The foaming oven was maintained at 177° C. which is above the activation temperature of the foaming agent. The resultant foam was inspected for quality. The most common defect in the foam was splitting. This could range from slight (1 small split) to severe (1 or more large splits).

The conditions and results of a series of such operations is shown in the following table:

| Example | Gum[1] | Max. Mix. Temp. (°C.) | Pre-Cure Time (min.) | Results |
| --- | --- | --- | --- | --- |
| 1 | A | 51 | 7 | low rise |
|  | A | 51 | 9 | good |
|  | A | 51 | 10 | good |
| 2 | A | 61 | 7 | low rise |
|  | A | 61 | 9 | excellent |
|  | A | 61 | 10 | good but slight split |
| 3 | B | 70 | 15 | good |
|  | B | 70 | 15[2] | good |
|  | B | 70 | 15[3] | good |
|  | B | 70 | 15[4] | good |
| 4 | B | 71.1 | 10 | good |
|  | B | 71.1 | 12 | good |
|  | B | 71.1 | 12[2] | good |
| 5 | B | 73.9 | 6 | split |
|  | B | 73.9 | 10 | split |
| 6 | B | 82 | 15 | severe split |
|  | B | 82 | 15 | severe split |
|  | B | 82 | 10 | severe split |

[1]Two gums were used designated A and B.
[2]At 30 minute expansion time
[3]At 40 minute expansion time
[4]At 60 minute expansion time This series of tests showed that with this formulation good foam quality resulted at mixing temperatures up to about 71° C. Thus, when in foam production with this formulation, the pre-determined temperature at which mixing is stopped is about 70° C. With other formulations, the pre-determined temperature might vary but it can be readily determined for each formulation by following the above general procedure.

I claim:

1. A process for making a polyphosphazene foam having consistent appearance and physical properties, said process comprising:
   (A) forming a composition comprising a substantially linear high molecular weight polyphosphazene gum, a curing agent, a blowing agent and optionally a plasticizer, an inorganic filler, an accelerator and processing aids,
   (B) masticating said composition to form a substantially homogenous blend while measuring the temperature of said composition undergoing mastication and continuing said masticating until said temperature rises to a pre-determined level up to about 71° C. and then stopping said masticating,
   (C) forming the resultant masticated composition into a shaped composition and
   (D) heating said shaped composition in an unconfined environment to a temperature which activates said blowing agent causing said shaped composition to expand into a foamed composition and completes curing of said foamed composition.

2. A process of claim 1 wherein said polyphosphazene gum is a phenoxy substituted polyphosphazene gum wherein said phenoxy substituents are selected from phenoxy, alkylphenoxy, alkoxyphenoxy, alkenylphenoxy, halophenoxy, alkylaminoalkylphenoxy, dialkylaminoalkylphenoxy, haloalkylphenoxy and mixtures thereof.

3. A process of claim 2 wherein said phenoxy substituents are selected from phenoxy, lower alkyl phenoxy and allylphenoxy.

4. A process of claim 3 wherein said phenoxy substituents are about 30–60 mole percent phenoxy, about 30–60 mole percent para-ethylphenoxy and about 1–20 mole percent ortho-allylphenoxy.

5. A process of claim 2 wherein said shaped composition from (C) is maintained at a pre-cure temperature below the activation temperature of said blowing agent thereby increasing the viscosity of said shaped composition.

6. A process of claim 1 wherein said curing agent comprises sulfur.

7. A process of claim 6 wherein said composition includes an accelerator which is a zinc dialkyldithiocarbamate.

8. A process of claim 6 wherein said blowing agent is a compound that evolves nitrogen upon decomposition.

9. A process of claim 8 wherein said blowing agent is selected from azodicarbonimide, 1,1'-azobisformamide and mixtures thereof.

10. A process of claim 8 wherein said composition includes a zinc fatty acid salt.

11. A process of claim 10 wherein said zinc fatty acid salt is zinc stearate.

12. A process of claim 4 wherein said pre-determined level is within the range of about 55°–71° C. and said curing agent comprises sulfur.

13. A process of claim 12 wherein said pre-determined level is within the range of about 65°–71° C.

14. A process of claim 7 wherein said blowing agent is a compound that evolves nitrogen upon thermal decomposition and said pre-determined temperature is within the range of about 55°–71° C.

15. A process of claim 14 wherein said composition includes a zinc fatty acid salt.

16. A process of claim 15 wherein said blowing agent is selected from azodicarbonimide, 1,1'-azobisformamide and mixtures thereof.

17. A process of claim 5 wherein said curing agent comprises sulfur and said shaped composition is maintained at a pre-cure temperature of about 100°–120° C. for a period of about 5–20 minutes and is then heated in an unconfined environment to a temperature which activates said blowing agent causing said shaped composition to expand into a foamed composition and completes curing of said foamed composition.

18. A process of claim 17 wherein said composition includes an accelerator which is a zinc dialkyldithiocarbamate and said blowing agent is selected from azodicarbonimide, 1,1'-azobisformamide and mixtures thereof.

19. A process of claim 17 wherein said pre-determined temperature is within the range of about 55°–71° C.

20. A process of claim 19 wherein said composition includes an accelerator.

21. A process of claim 20 wherein said accelerator is a zinc dialkyldithiocarbamate.

22. A process of claim 21 wherein said blowing agent is selected from azodicarbonimide, 1,1'-azobisformamide and mixtures thereof.

23. A process of claim 22 wherein said composition includes a zinc fatty acid salt.

* * * * *